Patented May 19, 1942

2,283,531

UNITED STATES PATENT OFFICE 2,283,531

VITAMIN FOOD PRODUCT AND PROCESS OF PRODUCING THE SAME

André E. Briod, Belleville, N. J., and Bernard A. Dombrow, New York, N. Y., assignors to National Oil Products Company, Harrison, N. J., a corporation of New Jersey No Drawing. Application May 5, 1938, Serial No. 206,200

10 Claims. (Cl. 99—11)

The invention relates in general to the manufacture of vitamin fortified foods and in particular to a process of producing a protected high potency vitamin-containing product in dry form, to a process of fortifying foods therewith and to correlated improvements in the products thus produced.

The enriching of foods with various vitamins has received a great deal of attention during recent years. Abundant research has been carried on with a view to finding means of successfully incorporating the various vitamins or products rich therein into various foods without affecting the normal taste or odor of the food. This is particularly true when fish liver or like oils or concentrates thereof rich in vitamins A and D are to be incorporated in foods. The most important problem, however, was to inhibit oxidation and decomposition of the vitamins subsequent to their incorporation into foods. Heretofore many proposals have been made in an attempt to accomplish the foregoing purposes. For example U. S. Patent 1,633,711 discloses impregnating dried yeast with cod liver oil, adding this mixture to a dilute aqueous solution of Karaya gum and drying the mass, whereby each oil impregnated granule is provided with an enveloping film of the gum. Another proposal is offered in U. S. Patent 1,764,085 wherein there is disclosed a process of admixing cod liver oil with a waxy substance such as paraffin, impregnating dry granular vegetable material with the oil-wax mixture and cooling to form a granular mass. U. S. Patent 1,964,867 combines in effect the teachings of the aforementioned patents by the conjoint use of a wax and a water-soluble gum. The purpose of using soluble gums, waxes and the like as disclosed in the cited patents is to provide protection for the vitamin containing oil against oxidation and decomposition. However, various difficulties have been experienced with the foregoing practices in the way of decomposition. Moreover, the use in foods of extraneous or foreign substances such as Karaya and other gums and paraffin and like waxes is highly undesirable from a physiological standpoint. The general public is reluctant to imbibe in foods containing such foreign substances. Furthermore, such foreign substances tend to interfere with the proper absorption by the body of the vitamins contained in the food or feed.

The general object of the invention is to obviate the foregoing and other disadvantages.

A specific object of the invention is to provide a stable vitamin A and D enriched vegetable matter in dry form which is free from foreign or extraneous substances.

Another object of the invention is to provide a vitamin enriched product in dry form displaying enhanced stability.

A further object of the invention is to provide an improved process of producing a vitamin enriched product in dry form.

An additional object of the invention is to provide improved foods for human or animal consumption fortified with vitamins A and/or D dispersed in a dry carrier.

Other objects of the invention will in part be obvious and will in part appear hereinafter.

According to the invention the process comprises forming an aqueous paste or slurry of a vegetable matter containing natural hydrophilic dispersing substances, dispersing a vitamin rich material therein and drying the mass. The resulting product which usually comprises an agglomerated mass of vegetable particles coated and/or impregnated with the material rich in a fat-soluble vitamin and bearing an outer protective film of protein, pectin, carbohydrate and/or other natural hydrophilic substances normally present in the original vegetable matter, may be used as such or reduced to a comminuted form and incorporated into foods or molded into desired shapes for consumption.

The invention accordingly comprises the several steps and the relation of one or more of such steps with respect to each of the others, and the composition possessing the features, properties and the relation of constituents, which are exemplified in the following detailed disclosure, and the scope of the invention will be indicated in the claims.

In carrying out the process of the invention any suitable vegetable material in dry form containing protein, pectin, carbohydrate and/or naturally-occurring hydrophilic substances, is admixed with water to form a paste or slurry, which is preferably stirred or agitated by any suitable means until a smooth homogenous mass results and at which time the water will have properly dissolved or hydrated the hydrophilic matter present in the vegetable material. The amount of water used should be controlled so as to obtain the proper consistency of the mass which should, in turn, be governed according to the particular manner in which the product is to be dried. If the product is to be dried in pans, the consistency of the paste should be such as to prevent any appreciable settling during the drying step. On the other hand a slurry of lower consistency is desirable when the product is to be dried on a moving surface such as a roller drier or the like.

When a smooth and homogenous paste or slurry of the proper consistency has been prepared, any suitable material rich in vitamins A and/or D is dispersed in the mass. The vitamin rich material is preferably added gradually with continuous stirring. Any suitable material rich in vitamin A and/or D may be used, such as cod or other fish liver oils, palm oil, concentrates thereof, fish liver oils fortified with a vitamin A and/or D concentrate, oil solutions of antirachitic activated sterols, such as irradiated ergosterol, irradiated cholesterol, or other similar substances. During the step of dispersing or emulsifying the vitamin rich material in the mass, this material apparently coats and/or impregnates the individual vegetable particles, which are, in turn, coated with a film of the protein, pectin, carbohydrate and/or other hydrophilic substances present, thereby forming the disperse phase of the resulting dispersion. The expression "bearing" is used in the appended claims to cover both an impregnated and/or a coated product.

The foregoing product is subjected to drying by any suitable means under appropriate conditions. The mass may be spread in shallow trays and subjected to moderate heat in a chamber maintained under reduced pressure or the mass may be spray dried or passed over a roller drier of known construction. During the drying step the structure and relationship of the individual particles in the disperse phase is not changed to any appreciable extent. While the particles tend to agglomerate, they each comprise a nucleus of vegetable material which is coated and/or impregnated with vitamin rich material, the whole being enveloped in an air-excluding film of protein, pectin, carbohydrate and/or like hydrophilic substances.

While the mass may be used as such, it is preferable to crush or otherwise comminute the same so that it may be readily molded or pressed into predetermined shapes or blended or admixed with a food of suitable type. In subdividing the dried mass, the size of the resulting particles may be controlled to suit the desired conditions. The size of the particles should preferably be the same, or at least approximate the size of the particles of the food to be fortified to inhibit settling of the vitamin enriched material during storage or while in transit.

The resulting material has exhibited remarkable stability with respect to the vitamin A and D potency even after storage in the presence of air for long periods of time. This phenomenon is attributed to the air excluding film formed about each particle, whereby the vitamins are protected from the usual oxidizing influences of the ambient atmosphere. Moreover, this valuable result may also be due, in part, to the natural antioxidants present in the original vegetable matter which further ensures the vitamins against oxidation.

As aforementioned, the carrier for the vitamin rich material may comprise any suitable vegetable matter which inherently contains proteins, pectins, carbohydrates and/or other hydrophilic substances, which possess dispersing properties in an aqueous medium. As examples of such materials, the following, inter alia, have been found to function in the manner hereinbefore described: meals prepared from oil-bearing seeds after expressing and/or extracting most of the oil contained therein by means of pressure, solvents or other methods of rendering the oil to produce a relatively oil-free meal. Such meals may be obtained from cotton-seed, maize, flaxseed, sesame, soya beans, peanuts, copra, cocoa beans, wheat germ, etc. Meals prepared from cereals or other vegetative materials relatively low in oil content may also be used, such as oatmeal, barley meal, wheat meal, hominy meal, alfalfa, dried grass powder, etc.

Any suitable natural or synthetic material rich in any one or more of the fat-soluble vitamins A, D and E may be used according to the invention, the corresponding provitamins being included under the generic expression "vitamins." It is preferred to use animal, vegetable or fish oils rich in the fat-soluble vitamins, such as cod liver, halibut liver, sardine, tuna, palm and like oils, concentrates thereof or such oils fortified with vitamin concentrates. Other sources of the fat-soluble vitamins, such as antirachitic activated sterols and the like, may also be used alone or in conjunction with the aforementioned or other vitamins. While the vegetable materials employed normally contain vitamins B and G, additional quantities of these vitamins, as well as other water-soluble vitamins such as vitamin C or the like, may be added.

For a fuller understanding of the nature and objects of the invention, reference should be had to the following examples which are given merely to further illustrate the invention and are not to be construed in a limiting sense, all parts given being by weight.

Example I

A slurry is made by thorough mechanical mixing of nine pounds cottonseed meal and 18 pounds water. Into this slurry, there is introduced one pound of a fortified cod liver oil containing 12,000 U. S. P. units of vitamin A and 1600 U. S. P. units of vitamin D per gram. Mixing is continued until a homogenous paste results. The material is then spread on trays and dried in a vacuum drier at slightly elevated temperature (e. g., 100–150° F.). The dried meal is then broken up and ground to the desired state of fineness for use in the fortification of food or feed materials on the basis of its vitamin content of approximately 1200 U. S. P. units of vitamin A and 160 U. S. P. units of vitamin D per gram. After six months' storage, the original powder still retains its vitamin A and D content without appreciable loss, while direct mixing of the oil into the meal without the above process results in 100% destruction of the vitamin A in a similar period.

Example II

Same as Example I, except that the fortified cod liver oil used is made to contain 0.1% of an antioxidant, such as hydroquinone, catechol, p-aminophenol, hydroquinone monomethyl ether, etc. or any other antioxidant which has the property of retarding the rate of oxidation of fatty materials.

Example III

A slurry is made with nine pounds of oatmeal flour and 14 pounds of water. Into this slurry, one pound of a fish liver oil containing 30,000 vitamin A units and 4000 vitamin D units is emulsified by mechanical means. This emulsification may be attained by simply stirring the oil into the slurry, or by diluting the slurry with water and homogenizing the oil into it by means of a homogenizer, colloid mill or other emulsifying device. The slurry into which the oil has been dispersed is then dried in a vacuum chamber, or by such other means as spray-drying or drying over heated rollers.

The dried material is ground, if necessary, and the powder thus obtained can be used as a stable source of vitamins for the fortification of foods.

*Example IV*

Same as Example III, except that a solution of vitamin D produced by synthetic means, such as by the irradiation of ergosterol, by the activation of cholesterol by physical or chemical means, etc., is used instead of fish liver oil.

*Example V*

Same as Example III, substituting one pound of wheat germ oil containing a vitamin A and D concentrate for the fish liver oil.

The vitamin rich vegetable carrier of the invention may be used to fortify, dry or wet poultry mashes, prepared animal feeds, cereals or flours produced therefrom, milk powder, malt powder, etc., or for the production of vitamin bearing tablets of increased stability which may or may not have an exterior sugar or like coating, etc.

While the invention is particularly concerned with the incorporation into a vegetable carrier of vitamins A, D and/or E, the other vitamins B, C and G may also be incorporated individually or collectively along with either one or more of the vitamins A, D and/or E. From the foregoing it is clear then that a stable edible vitamin fortified product in dry form has been successfully produced. As hereinbefore stated, the vitamin potency of the dried product is maintained substantially constant for relatively long periods of time.

Since certain changes in carrying out the above process and certain modifications in the composition which embody the invention may be made without departing from its scope, it is intended that all matter contained in the above description shall be interpreted as illustrative and not in a limiting sense.

Having described our invention what we claim as new and desire to secure by Letters Patent is:

1. A process of producing an edible vitamin fortified material which comprises forming an aqueous slurry of a substantially oil-free oil-bearing seed meal, dispersing therein a material rich in a fat-soluble vitamin, drying the resulting mass and incorporating the dried mass into a food.

2. A process of producing an edible vitamin fortified material which comprises forming an aqueous slurry of a substantially oil-free oil-bearing seed meal, dispersing therein a material rich in vitamin A and drying the resulting mass.

3. A process of producing an edible vitamin fortified material which comprises forming an aqueous slurry of a substantially oil-free oil-bearing seed meal, dispersing therein a material rich in vitamin D and drying the resulting mass.

4. A process of producing an edible vitamin fortified material which comprises forming an aqueous slurry of a substantially oil-free oil-bearing seed meal, dispersing therein a material rich in vitamins A and D and drying the resulting mass.

5. An edible vitamin fortified material comprising oil-free, oil-bearing seed meal particles bearing a fat-soluble vitamin and having an outer protective film of natural hydrophilic substances derived from said seed meal.

6. An edible vitamin fortified material comprising oil-free, oil-bearing seed meal particles bearing a material rich in vitamin A and having an outer protective film of natural hydrophilic substances derived from said seed meal.

7. An edible vitamin fortified material comprising oil-free, oil-bearing seed meal particles bearing a material rich in vitamin D and having an outer protective film of natural hydrophilic substances derived from said seed meal.

8. An edible vitamin fortified material comprising oil-free, oil-bearing seed meal particles bearing a material rich in vitamins A and D and having an outer protective film of natural hydrophilic substances derived from said seed meal.

9. An edible vitamin fortified material comprising oil-free cottonseed meal particles bearing a fat-soluble vitamin and having an outer protective film of natural hydrophilic substances derived from said cottonseed meal.

10. An edible vitamin fortified material comprising oil-free flaxseed meal particles bearing a fat-soluble vitamin and having an outer protective film of natural hydrophilic substances derived from said flaxseed meal.

ANDRÉ E. BRIOD.
BERNARD A. DOMBROW.